Feb. 20, 1951 W. J. RADY ET AL 2,542,703
ENGINE CONTROL SYSTEM
Filed April 29, 1949 2 Sheets-Sheet 2

INVENTORS
WILLIAM J. RADY
LYMAN A. RICE
By *Ormar Hardman & Fehr*
THEIR ATTORNEYS Patented Feb. 20, 1951

2,542,703

UNITED STATES PATENT OFFICE 2,542,703

ENGINE CONTROL SYSTEM

William J. Rady and Lyman A. Rice, Anderson, Ind., assignors to General Motors Corporation, Detroit, Mich., a corporation of Delaware Application April 29, 1949, Serial No. 90,294

6 Claims. (Cl. 192—3)

This application is a continuation-in-part of copending application, Serial No. 10,754, filed February 25, 1948, and now abandoned.

This invention relates to a system of control for an automotive vehicle, for example, a passenger bus propelled by a Diesel engine; and its object is to protect the engine in case of emergency, such as overheating or lack of lubricating oil, by causing the engine and the vehicle to stop regardless of failure of the operator to stop the engine by manual control. The present invention provides an electrical system of control for a vehicle comprising an engine fuel control valve spring biased to open position, a solenoid for closing the valve, a normally open emergency switch which closes in case of abnormal engine operating conditions, a two-way manually operated switch having "on" and "off" positions, a current source, means rendered effective by positioning the manually operated switch in "on" position and by closure of the emergency switch for causing the solenoid to be energized sufficiently by the current source to close the fuel valve and means rendered effective in response to movement of the manually operated switch to "off" position for effecting disconnection of the solenoid from the current source.

Further objects and advantages of the present invention will be apparent from the following description, reference being had to the accompanying drawings, wherein a preferred embodiment of the present invention is clearly shown.

Figure 1:
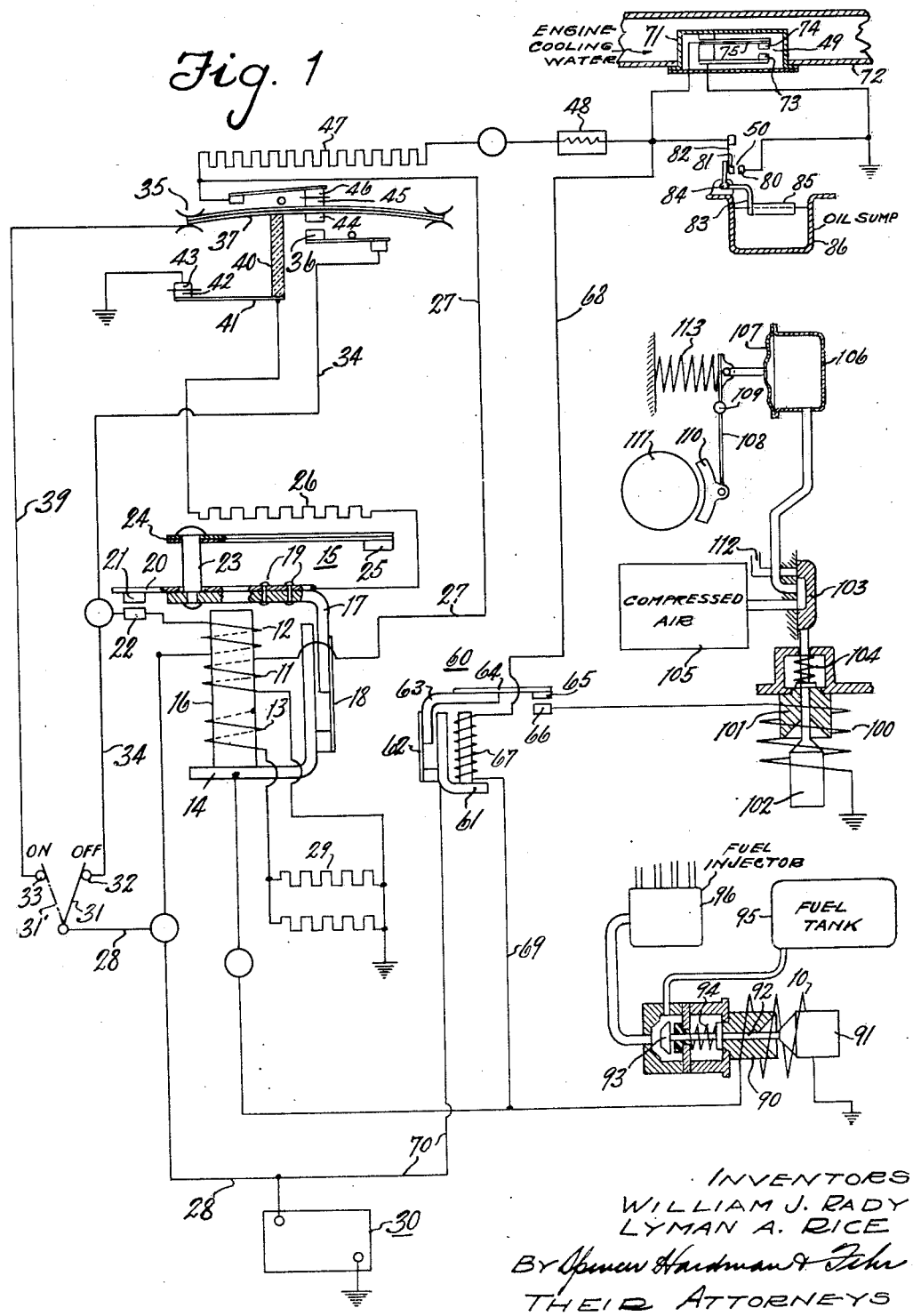
Fig. 1 is a wiring diagram of an embodiment of the present invention and includes diagrammatic illustrations of a Diesel engine fuel system, an air brake system and switches which are controlled by conditions of engine operation.

The engine is controlled manually in the conventional manner by a fuel valve (not shown) which, when opened, permits the engine to operate after being started and which, when closed, causes the engine to stop. Referring to Fig. 1, the engine is stopped automatically by a solenoid 10 which, when energized, closes the engine fuel valve. The solenoid 10 is used only to close the fuel valve and after the valve is closed, the solenoid is automatically deenergized. The solenoid is energized to close the fuel valve by an automatic control which responds to excessive temperature of the engine and to insufficient lubricating oil.

Solenoid 10 is connected with the frame 14 of a relay 15 having a core 16 surrounded by windings 11, 12 and 13 and having an armature 17 connected by a spring hinge 18 with the frame 14. Rivets 19 secure to the armature a blade 20 carrying a contact 21 engageable with a contact 22. Armature 17 carries a stud 23 which passes through a hole in the blade 20 and through a slot in the bimetal blade 24 secured to a support 25. The function of the blade 24 is to bend upwardly upon being heated in order to effect separation of contact 21 from contact 22 under certain conditions although the relay may be energized. 26 is a resistance element for heating the bimetal blade 24. Coil 11 is connected with ground and with a wire 27. Coil 12 is connected with contact 22 and with a wire 28 with which a current source 30, such as a storage battery, is connected. One end of coil 13 is connected with the core 16 and through the frame 14 with the solenoid 10. The other end of coil 13 is connected with external resistances 29 which are grounded. Wire 28 is connected with a manually operated toggle switch 31 which, in "off" position, engages a contact 32 and which, in "on" position 31', engages a contact 33. Switch 31 is so connected with a manually operated member (not shown) for controlling a part of the bus so that movement of said member to render operative the door operating mechanism, for example, causes the switch 31 to move to "on" position. Contact 32 is connected through wire 34 with relay contact 22 and with contact 36 of a thermal switch 35 having a bimetal flip disc 37 connected by wire 39 with switch contact 33. Disc 37 carries a non-conducting block 40 supporting a spring blade 41 carrying a contact 42 normally engageable with a grounded contact 43. Blade 41 is connected with heater resistance 26 of the relay 15. Contact 36 is normally out of engagement with a contact 44 located on the underside of the flip disc 37 which carries, on its upper side, a contact 45 engageable with a contact 46 connected with wire 27 and with a heater resistance 47 connected with a buzzer or a bell magnet 48 which is connected with switches 49 and 50 which are grounded. Switch 49 closes when the engine temperature exceeds a certain amount and switch 50 closes when the engine oil level becomes too low.

Switch 49 is enclosed in a metal box 71 set into a pipe 72 which conducts engine cooling water and comprises a fixed grounded contact 73 and a contact 74 attached to a bimetal blade 75. As water temperature increases, blade 75 bends down and causes contact 74 to engage contact 73 when water temperature, which is a function of engine temperature, becomes excessive.

Switch 50 comprises a fixed grounded contact 80 and a movable contact 81 attached to a spring blade 82 engaged by a lever 83 pivoted at 84 and carrying a float 85 buoyed by oil in an oil sump 86 of the engine. When the level of oil in sump 86 becomes too low, switch 50 is closed.

Solenoid 10 surrounds a core 90 and a movable armature 91 connected by a rod 92 with a valve 93 normally opened by a spring 94 to connect a fuel tank 95 with a fuel injection 96 connected with the Diesel engine.

Figure 2:
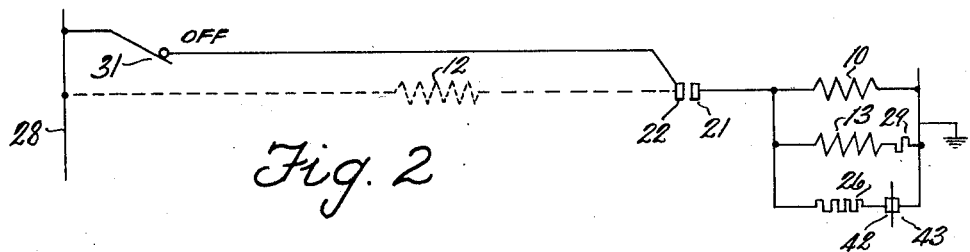
Figs. 2 to 6 are wiring diagrams of portions of Fig. 1 and are referred to in the explanation of the mode of operation.

As shown in Fig. 2, the switch 31, which parallels relay coil 12, is normally in "off" position. Switch 31 and coil 12 are in series with contacts 22, 21 and with circuits in parallel comprising solenoid 10, relay coil 13 and heater resistance 26 in series with normally closed contacts 42, 43.

Coincidentally with rendering operative the door operating mechanism of the bus by movement of a manually operable member, the switch 31 is moved to "on" position 31', thereby connecting the battery 30 with one terminal of the buzzer magnet 48 through a circuit which includes: the wire 28, switch 31 at 31', wire 39, flip disc 37, contacts 45 and 46 and heater resistance 47.

Figure 3:
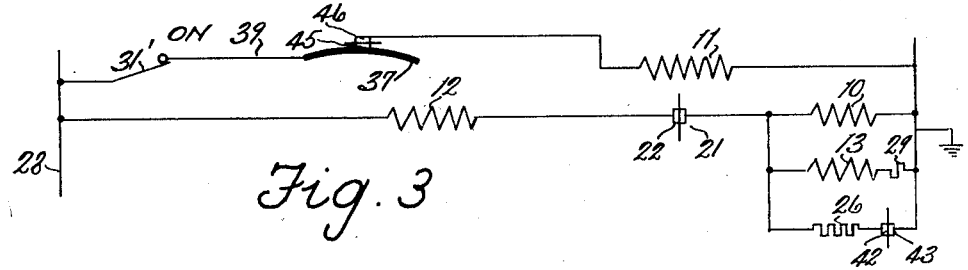

Normally when switch 31 is moved to "on" position 31', heater resistance 47 and buzzer coil 48 do not receive current because switches 49 and 50 are open. Relay contact closing coil 11 receives current from the battery 30 through the following circuit shown in Fig. 3: wire 28, switch 31, wire 39, contacts 45, 46, wire 27, coil 11, and ground. Contact 21 engages contact 22. Coil 12 and solenoid 10 are in series with the battery through the following circuit: wire 28, coil 12, contacts 22, 21, armature 17, frame 14 and solenoid 10. Solenoid 10 is not then sufficiently energized to close the fuel valve.

To shut off the engine in the normal manner, switch 31 is moved to "off" position and coil 12 is short circuited as shown in Fig. 2, and coil 11 is open circuited. Contacts 21, 22 remain closed by virtue of coil 13 which is sufficiently energized for this purpose when coil 12 is short circuited. The battery 30 is then directly connected with the solenoid 10 and the heater 26, through switch 31, contacts 22, 21, armature 17 and relay frame 14. Solenoid 10, being energized, closes the fuel valve and the engine stops. After coil 12 is short circuited, heater 26 receives current sufficient to cause such heating of blade 24 that it bends upwardly with force separation of contact 21 from contact 22 against the magnetic pull of coil 13. Therefore coil 13, solenoid 10 and heater 26 are open circuited. The status is then as shown in Fig. 2.

Figure 4:
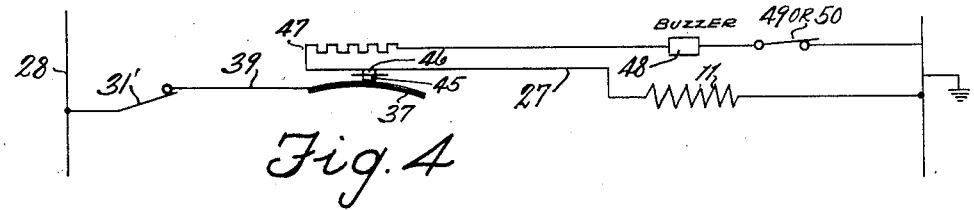
Figure 5:
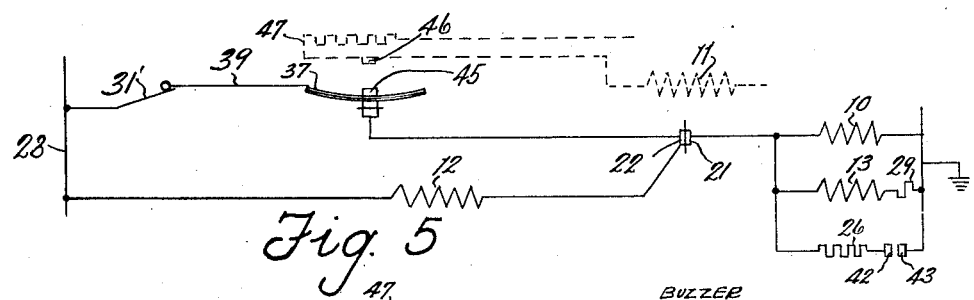

If, while switch 31 is in "on" position, either or both the switches 49, 50 are closed as shown in Fig. 4, the heater resistance 47 becomes effective to cause the disc 37 to bow downwardly to cause separation of contacts 45, 46 and contacts 42, 43 and engagement of contacts 44, 36 as shown in Fig. 5 which short circuits coil 12. Solenoid 10 is then directly connected with the battery 30 through the following circuit: wire 28, switch 31 at 31', wire 39, contacts 44, 36, wire 34, contacts 22, 21, armature 17, frame 14, solenoid 10. The solenoid is then effective to close the fuel valve to stop the engine regardless of failure of the operator to do so although the buzzer 48 had sounded a warning before contacts 45, 46 had separated. Although the solenoid 10 has closed the fuel valve, it is still energized because coil 13 is holding contacts 21, 22 closed although coil 11 is open circuited by separation of contacts 45 and 46 and coil 12 is short circuited by engagement of contacts 44 and 36. The circuit of coil 13 is then by way of closed contacts 21, 22, armature 17 and frame 14.

When contacts 45, 46 separate, the heater resistance 47 is disconnected and the flip disc 37 cools and finally snaps to normal position shown to reengage these contacts. The contact separation time is substantially greater than the contact closing time. During the longer contact separation time, the bus may coast to a stop, although the driver may not move the switch 31 to "off" position before the contacts 45, 46 reengage. Assuming that the operator moves switch 31 to the "off" position before the contacts 45 and 46 reengage, coil 12 is short circuited but coil 13 is still effective to maintain engagement of contacts 21, 22. When the disc 37 bows upwardly on cooling to reengage contacts 42 and 43, the heater 26 receives current and causes the blade 24 to bend upwardly to disconnect coil 13, solenoid 10 and heater 26 from the battery.

Figure 6:
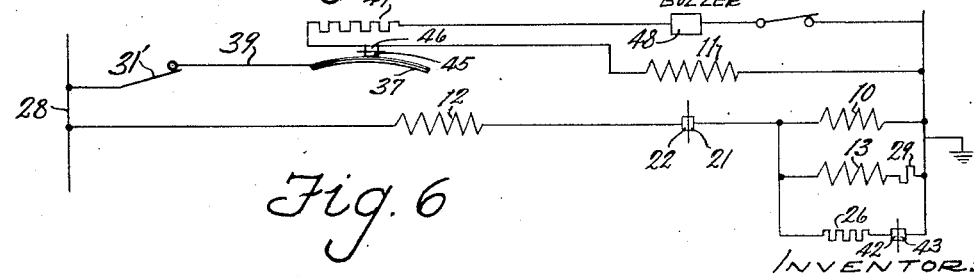

If the operator leaves the switch 31 in "on" position until after contacts 45, 46 reengage, coils 11 and 12 will be effective again as shown in Fig. 6, and the fuel valve will open because solenoid 10 is not then sufficiently energized. But the engine does not start although the fuel valve is open, since the operation of an engine starter is required to start it. The buzzer will sound again to remind the operator to move the switch 31 to "off" position. Then, as switch 31 is moved away from contact 33, coil 11 is disconnected. When switch 31 engages contact 32, coil 12 is short circuited and coil 13 becomes sufficiently energized to hold contacts 21, 22 in engagement against the normal action of the blade 24. Contacts 45, 46, having been reengaged, and coil 12, having been short circuited by movement of switch 31 to "off" position, the heater 26 receives current sufficient to cause the blade 24 to bend upwardly and separate contacts 21 and 22, thereby disconnecting the battery from coil 13, heater 26 and solenoid 10.

If, after closing the fuel valve by energization of the solenoid in response to closing of a switch 49 or 50, the vehicle could coast down grade and drive the engine, means are provided for causing the vehicle brakes to be applied when the solenoid is energized. A relay 60 has a frame 61 connected by a spring hinge 62 with an armature 63 carrying a spring blade 64 supporting a contact 65 engageable with a contact 66 connected with electrically controlled means for causing application of the vehicle brakes. The magnet coil 67 of the relay is connected by wire 68 with switches 49 and 50 and by wire 69 with solenoid 10. When solenoid 10 is energized in response to closing of a switch 49 or 50, coil 67 receives current and relay 60 closes its contacts so that current can flow from the battery 30 through wire 70 and contacts 65, 66 to solenoid coil 100 (Fig. 1) which surrounds a core 101 and an armature 102 connected with a valve 103 normally positioned by a spring 104 to connect a compressed air tank 105 with a chamber 106 having a flexible wall 107 connected by a lever 108 pivoted at 109 and carrying a brake shoe 110 engageable with a brake drum 111 rotating with the vehicle axle. When valve 103 is in the position shown, the shoe 110 is retracted from the drum 111. When coil 100 is energized in response to closing of relay contacts 65, 66, armature 102 moves up to cause valve 103 to block flow of compressed air to the chamber 106 and to connect the latter with a vent 112; and spring 113 effects the application of the vehicle brakes.

From the foregoing description, it is apparent that the invention provides means including the thermal switch 35 and its heater which is rendered effective by positioning the manually operated switch 31 in "on" position and by the closing of the emergency switch 49 or 50 to cause, by short circuiting the coil 12 which had been operating to reduce voltage applied to solenoid 10, the solenoid to become sufficiently energized to cause closing of the fuel valve 93 and provide means including the bimetal blade 24 and the heater 26 which is rendered effective to disconnect the solenoid from the current source when the manually operated switch is moved to "off" position in which it short circuits the coil 12.

While the embodiment of the present invention as herein disclosed, constitutes a preferred form, it is to be understood that other forms might be adopted.

What is claimed is as follows:

1. A system of control comprising a current source, a solenoid, a relay switch having a fixed contact and a movable contact, an armature for moving the movable contact into engagement with the fixed contact and normally biased for separation of the contacts and having three magnet coils, the first of which is effective when connected with source to attract the armature to close the contacts and the second and third of which, when effectively energized, are operative to hold the contacts closed after the first coil is open circuited, a bimetal member connected with the relay armature and effective, when heated, to open the relay contacts against magnetic pull exerted by the third relay coil, a resistance element for heating the bimetal member, a manually operated switch having "off" and "on" positions, a circuit established across the source terminals when the manual switch is in "on" position and including the first relay coil whereby the relay contacts close, a circuit established across the source terminals by closing of the relay contacts and comprising the second relay coil in series with the relay contacts and a circuit including, in parallel, the third relay coil, the solenoid and the heater resistance, the second relay coil absorbing voltage such that the three parts in parallel are insufficiently energized, movement of the manual switch to "off" position open-circuiting the first relay coil, and a short circuit of the second relay coil established by movement of the manual switch to "off" position whereby the third relay coil is operative to hold the relay contacts in engagement, the solenoid is fully energized and the heater resistance receives current rendering it operative to heat the bimetal member so that it will force separation of the relay contacts and third relay coil, the solenoid and the heater resistance are open-circuited.

2. A system according to claim 1 in which there is a second bimetal member, a thermal switch which includes the second bimetal member and three pairs of contacts actuated thereby namely, a first pair which are normally closed, a second pair which are normally open and a third pair which are normally closed, a second resistance for heating the second bimetal member, in which the first pair of contacts is in the circuit of the first relay coil and also in a series circuit paralleling the first relay coil and comprising the second heater resistance of the thermal switch, a signal, and an emergency switch, in which the second pair of contacts of the thermal switch provides when closed a short circuit of the second relay coil, in which the third pair of contacts of the thermal switch is in series with the first mentioned heater resistance whereby, when the manual switch is in "on" position and an emergency switch is closed, the first pair of thermal switch contacts open in response to current flow in the second heater resistance to open circuit the first relay coil and the second heater resistance the second pair of thermal switch contacts closes to short circuit the second relay coil and the third pair of thermal switch contacts open to open-circuit the first heater resistance in consequence of which the third relay coil and the solenoid become effective and the relay contacts remain closed so long as the manual switch remains in "on" position, and whereby said relay contacts open provided the manual switch is moved to "off" position and the second bimetal member has cooled and returned to normal position to close the circuit of the first heater resistance.

3. An electrical system of control for a vehicle comprising an engine fuel control valve spring biased to open position, a solenoid for closing the valve, a normally open emergency switch which closes in case of abnormal engine operating conditions, a two-way manually operated switch having "on" and "off" positions, a current source, a relay having contacts, a first or contact closing coil and second and third coils for holding the contacts in engagement, the second and third coils being in series with the current source and with the relay contacts, and the third coil being in parallel with the solenoid, a short-circuit of the second coil established by the manually operated switch when in "off" position, a circuit between the current source and first coil established by the manually operated switch in "on" position, means rendered effective by positioning the manually operated switch in "on" position and by the closing of the emergency switch for open-circuiting the first relay coil and for short-circuiting the second relay coil, thereby rendering the solenoid effective to close the fuel valve, said relay contacts remaining closed by energization of the third relay coil, and means operating after moving the manually operated switch to "off" position for causing separation of the relay contacts, thereby open-circuiting the third relay coil and the solenoid.

4. An electrical system according to claim 3 and including a second relay having normally open contacts and a contact closing coil which is connected with the current source by the contacts of the first relay and by the closing of the emergency switch and means energized by the closing of the second relay contacts for causing the application of vehicle brakes.

5. An electrical system of control for a vehicle comprising an engine fuel control valve spring biased to open position, a solenoid for closing the valve, a normally open emergency switch which closes in case of abnormal engine operating conditions, a two-way manually operated switch having "on" and "off" positions, a current source, a voltage dropping element connectible in series with the current source and solenoid, and when so connected causing the solenoid to be insufficiently energized to close the fuel valve, means rendered effective by positioning the manually operated switch in "on" position for establishing said series connection, means rendered effective by closing of the emergency switch while the manually operated switch is in "on" position to short-circuit the element whereby the solenoid becomes energized sufficiently to close the fuel valve, another short-circuit of the element established by the manually operable switch when in "off" position, and means rendered operative in response to the last mentioned short-circuiting of the element for causing the solenoid to be open-circuited.

6. An electrical system according to claim 5 having means which becomes effective to cause application of the vehicle brakes when the element is short-circuited while the manually operable switch is in "on" position and when the emergency switch is closed.

WILLIAM J. RADY.
LYMAN A. RICE.

REFERENCES CITED

The following references are of record in the file of this patent:

UNITED STATES PATENTS

| Number | Name | Date |
|---|---|---|
| 1,838,408 | King | Dec. 29, 1931 |
| 1,848,881 | Harvey | Mar. 8, 1932 |
| 1,901,554 | De Wilde | Mar. 14, 1933 |
| 2,162,174 | Jones | June 13, 1939 |
| 2,192,021 | Weeks | Feb. 27, 1940 |
| 2,260,576 | Gaybeck | Oct. 28, 1941 |
| 2,296,003 | Van Loo | Sept. 15, 1942 |
| 2,423,728 | Ray | July 8, 1947 |